United States Patent
LaPalme et al.

(10) Patent No.: US 11,721,879 B2
(45) Date of Patent: Aug. 8, 2023

(54) APPARATUS FOR MOUNTING A TRANSCEIVER TO AN ANTENNA STRUCTURE IN A CELLULAR COMMUNICATION SYSTEM

(71) Applicant: DISH Wireless L.L.C., Englewood, CO (US)

(72) Inventors: Jerome A. LaPalme, Aurora, CO (US); Richard Ripp, Jr., Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/452,431

(22) Filed: Oct. 27, 2021

(65) Prior Publication Data

US 2023/0127503 A1    Apr. 27, 2023

(51) Int. Cl.
*H01Q 1/12* (2006.01)
*F16M 13/02* (2006.01)
*H04B 1/38* (2015.01)

(52) U.S. Cl.
CPC .............. *H01Q 1/12* (2013.01); *F16M 13/02* (2013.01); *H04B 1/38* (2013.01)

(58) Field of Classification Search
CPC ............. H01Q 1/12; F16M 13/02; H04B 1/38
USPC .................................................... 248/220.21
See application file for complete search history.

(56) References Cited

U.S. PATENT DOCUMENTS

| | | | |
|---|---|---|---|
| D394,201 S | 5/1998 | Newell et al. | |
| D457,877 S | 5/2002 | McDonald et al. | |
| D532,412 S | 11/2006 | Yang | |
| D730,331 S | 5/2015 | Wong et al. | |
| 9,385,413 B2* | 7/2016 | Pass | H01Q 1/1207 |
| D805,888 S | 12/2017 | De Los Santos | |
| 9,853,346 B2* | 12/2017 | Skrepcinski | H01Q 1/1228 |
| 2008/0156949 A1* | 7/2008 | Sculler | F16M 11/10 248/220.21 |
| 2014/0263890 A1* | 9/2014 | McCarthy | F16M 13/02 29/428 |

(Continued)

OTHER PUBLICATIONS

Triad EEI Triad Mount, Isometric and Components dated Dec. 31, 2021 (9 pages).

(Continued)

*Primary Examiner* — Muhammad Ijaz
(74) *Attorney, Agent, or Firm* — KW Law, LLP (57) ABSTRACT

The subject matter disclosed here relates to a mounting system that facilitates the mounting of a transceiver to an antenna structure in a cellular communication system. In general, the mounting system includes an antenna mounting bracket, a transceiver mounting bracket, and a pair of guide rails. The antenna mounting bracket is configured to attach to the antenna structure while the transceiver mounting bracket is configured to attach to the transceiver. The pair of guide rails are configured to attach to the antenna mounting bracket and include channels to receive corresponding hooked structures on the transceiver mounting bracket. Specifically, the transceiver mounting bracket includes first and second hooked structures, and guide rails include first and second channels that are considered to receive the hooked structures such that the hooked structures can slide into the first and second channels on the guide rails.

20 Claims, 9 Drawing Sheets

(56) References Cited

U.S. PATENT DOCUMENTS

2021/0075083 A1\* 3/2021 Udagave ............... H01Q 1/1207
2022/0109223 A1\* 4/2022 Raybern ............... H01Q 1/1221
2022/0115762 A1\* 4/2022 Tsorng ................. H01Q 1/1228
2022/0128187 A1\* 4/2022 James ..................... F16M 11/18
2022/0328949 A1\* 10/2022 Han ..................... H01Q 1/1264
2022/0359973 A1\* 11/2022 Lapalme ................ H01Q 1/246

OTHER PUBLICATIONS

Triad EEI Triad Mount, Isometric and Components dated Nov. 2, 2020 (9 pages).
Triad EEI Triad Mount, Isometric and Components dated Jan. 24, 2020 (7 pages).

\* cited by examiner

APPARATUS FOR MOUNTING A TRANSCEIVER TO AN ANTENNA STRUCTURE IN A CELLULAR COMMUNICATION SYSTEM

TECHNICAL FIELD

Embodiments of the subject matter described herein relate generally to an apparatus, device, or system used to mount a transceiver to an antenna structure in cellular communication system.

BACKGROUND

A cellular communication system includes base stations (also known as cell sites) distributed throughout a geographical region. A base station includes equipment such as an antenna, mounting and support structure, one or more transceiver radio units, and the like. In a typical cellular communication system the antennas are mounted on a tower or other raised structures to provide good signal coverage. In some deployments, transceiver radio units can be mounted to the housing, frame, or shell of an antenna. A cellular system provider may source the antenna components, transceiver radio units, housing and other elements from a variety of different vendors or manufacturers. Consequently, the cellular system provider may have little to no control over the design, configuration, dimensions, and/or mounting features of antennas and transceiver radio units. Accordingly, different transceiver radio units may, but need not, be compatible with the mounting features and specifications of the antenna components. Mounting incompatibilities can present significant challenges, require custom mounting hardware, and/or require additional installation time in the field.

BRIEF SUMMARY

Disclosed here is a mounting system to mount a transceiver to an antenna structure for a cellular communication system. An exemplary embodiment of the mounting system includes: at least one antenna mounting bracket to attach to the antenna structure, the at least one antenna mounting bracket including at least one attachment face, the at least one attachment face offset from a back surface of the antenna structure, the at least one face including a plurality of mounting holes having a predefined spacing; a transceiver mounting bracket to attach to the transceiver, the transceiver mounting bracket including a first hooked structure and a second hooked structure; a first guide rail to attach to the antenna mounting bracket, the first guide rail including a first channel to receive the first hooked structure; and a second guide rail to attach to the antenna mounting bracket, the second guide rail including a second channel to receive the second hooked structure.

Also disclosed is an embodiment of a mounting system wherein the at least one mounting bracket comprises a pair of mounting brackets arranged in parallel on the back surface of the antenna structure.

Also disclosed is an embodiment of a mounting system wherein the plurality of mounting holes are perpendicular to the back surface of the antenna structure.

Also disclosed is an embodiment of a mounting system wherein the first hooked structure extends along a top edge of the transceiver mounting bracket and the second hooked structure extends along a bottom edge of the transceiver mounting bracket.

Also disclosed is an embodiment of a mounting system wherein the transceiver mounting bracket includes a plurality of mounting holes to facilitate mounting to the transceiver.

Also disclosed is an embodiment of a mounting system wherein the first channel includes two ends, and wherein the first channel includes openings at each of the two ends to facilitate entry of the first hooked structure from either of the two ends, and wherein the second channel includes two ends, and wherein the second channel includes openings at each of the two ends to facilitate entry of the first hooked structure from either of the two ends.

Also disclosed is an embodiment of a mounting system wherein the first guide rail includes a first clamping surface and a first fastener, wherein the first fastener is configured to pull the first clamping surface towards the first hooked structure to secure the first hooked structure in the first channel, and wherein the second guide rail includes a second clamping surface and a second fastener, wherein the second fastener is configured to pull the second clamping surface towards the second hooked structure to secure the second hooked structure in the second channel and wherein the first channel, the second channel, the first clamping surface, and the second clamping surface are formed from electrically isolating material.

Also disclosed is an embodiment of a mounting system wherein the second guide rail includes a detent pin and wherein the transceiver mounting bracket includes a plurality of detent holes spaced across the transceiver mounting bracket, the plurality of detent holes configured to selectively receive the detent pin and secure transceiver mounting bracket at a plurality of different locations relative to the second guide rail.

In another embodiment, a mounting system to mount a transceiver to an antenna structure is disclosed, where the mounting system includes: an antenna mounting bracket to attach to the antenna structure; a transceiver mounting bracket to attach to the transceiver, the transceiver mounting bracket including a first hooked structure and a second hooked structure; a first guide rail to attach to the antenna mounting bracket, the first guide rail including a first channel, a first clamping surface, and a first pair of fasteners, the first channel including open ends to slide the first hooked structure into the first channel from either side of the first channel, and wherein the first pair of fasteners is configured to pull the first clamping surface towards the first hooked structure to secure the first hooked structure in the first channel; and a second guide rail to attach to the antenna mounting bracket, the second guide rail including a second channel, a second clamping surface, and a second pair of fasteners, the second channel including open ends to slide the slide the second hooked into the second structure from either side of the second channel, and wherein the second pair of fasteners is configured to pull the second clamping surface towards the second hooked structure to secure the second hooked structure in the second channel Also disclosed is an embodiment of a mounting system wherein the antenna mounting bracket comprises a pair of mounting brackets arranged in parallel on a back surface of the antenna structure.

Also disclosed is an embodiment of a mounting system wherein the antenna mounting bracket includes a plurality of mounting holes that face away from a back surface of the antenna structure.

Also disclosed is a mounting system to mount an antenna structure for a cellular communication system to pole that includes:

Also disclosed is an embodiment of a mounting system wherein the first hooked structure extends along a top edge of the transceiver mounting bracket and the second hooked structure extends along a bottom edge of the transceiver mounting bracket.

Also disclosed is an embodiment of a mounting system wherein the transceiver mounting bracket includes a plurality of mounting holes to facilitate mounting to the transceiver.

Also disclosed is an embodiment of a mounting system wherein the transceiver mounting bracket includes a plurality of mounting holes to facilitate mounting to the transceiver.

Also disclosed is an embodiment of a mounting system wherein the transceiver mounting bracket includes a slideable legs that each include a plurality of mounting holes to facilitate mounting to the transceiver.

Also disclosed is an embodiment of a mounting system wherein the first channel, the second channel, the first clamping surface, and the second clamping surface are formed from electrically isolating material.

Also disclosed is an embodiment of a mounting system wherein the second guide rail includes a detent pin and wherein the transceiver mounting bracket includes a plurality of detent holes spaced across the transceiver mounting bracket, the plurality of detent holes configured to selectively receive the detent pin and secure transceiver mounting bracket at a plurality of different locations relative to the second guide rail.

In another embodiment, a mounting system to mount a transceiver to an antenna structure is disclosed, where the mounting system includes: a pair of antenna mounting brackets to attach to the antenna structure, the pair of antenna mounting brackets each including an attachment face, each attachment face offset from a back surface of the antenna structure, each face including a plurality of mounting holes facing away from the back surface of the antenna structure and having a predefined spacing; a transceiver mounting bracket to attach to the transceiver, the transceiver mounting bracket including a first hooked structure extending along a top edge of the transceiver mounting bracket, the transceiver mounting bracket including a second hooked structure extending along a bottom edge of the transceiver mounting bracket; a first guide rail to attach to the antenna mounting bracket, the first guide rail including a first channel, a first clamping surface, and a first pair of fasteners, the first channel including open ends to slide the first hooked structure into the first channel from either side of the first channel, and wherein the first pair of fasteners is configured to pull the first clamping surface towards the first hooked structure to secure the first hooked structure in the first channel; a second guide rail to attach to the antenna mounting bracket, the second guide rail including a second channel, a second clamping surface, and a second pair of fasteners, the second channel including open ends to slide the slide the second hooked into the second structure from either side of the second channel, and wherein the second pair of fasteners is configured to pull the second clamping surface towards the second hooked structure to secure the second hooked structure in the second channel; and wherein the second guide rail includes a detent pin and wherein the transceiver mounting bracket includes a plurality of detent holes spaced across the transceiver mounting bracket, the plurality of detent holes configured to selectively receive the detent pin and secure transceiver mounting bracket at a plurality of different locations relative to the second guide rail.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

It should be understood that various aspects disclosed herein may be combined in different ways than the arrangements specifically presented in the description and accompanying drawings.

The subject matter disclosed here relates to a mounting system that facilitates the mounting of a transceiver to an antenna structure in a cellular communication system. In general, the mounting system includes an antenna mounting bracket, a transceiver mounting bracket, and a pair of guide rails. The antenna mounting bracket is configured to attach to the antenna structure while the transceiver mounting bracket is configured to attach to the transceiver. The pair of guide rails are configured to attach to the antenna mounting bracket and include channels to receive corresponding hooked structures on the transceiver mounting bracket. Specifically, the transceiver mounting bracket includes first and second hooked structures, and guide rails include first and second channels that are considered to receive the hooked structures such that the hooked structures can slide into the first and second channels on the guide rails.

In additional embodiments the first and second guide rails both include clamping surfaces to secure the transceiver mounting bracket into place and thus to secure the transceiver to the antenna structure. In some additional embodiments both the first and second channels include openings at each end to facilitate entry of the transceiver mounting bracket into the channels from either side of guide rails. Furthermore, in some embodiments the channels and clamping surfaces are made from an electrically isolating material to provide electrical isolation between the antenna structure and the transceiver.

In other embodiments one or more of the guide rails include a detent pin to secure the position of the transceiver mount relative to the guide rail. Specifically, the transceiver mounting bracket can include multiple detent holes, with each detent holes configured to secure the transceiver mounting bracket at a different location relative to the guide rails when engaged with the detent pin.

In other embodiments the antenna mounting bracket and transceiver mounting brackets are configured to mountable to a variety of different types of antenna structures and transceivers from different equipment providers. For example, by providing mounting holes and/or slots in different combinations of spacings. So configured, the mounting system can provide a "universal" mounting system that facilitates the mounting of a variety of antenna structures and transceivers from different equipment providers.

Figure 1:
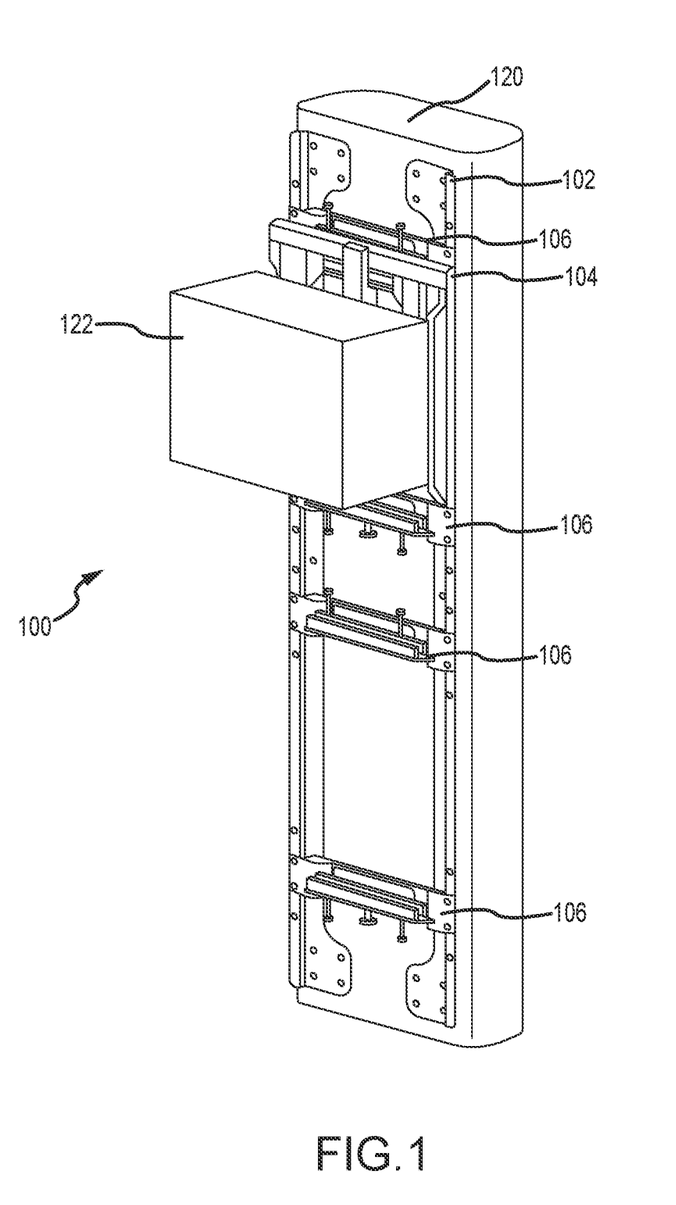
FIG. 1 is a perspective view of transceiver mounting system in accordance with the embodiments described herein.

Turning now FIG. 1, a perspective view of a mounting system 100 is illustrated. In general, the mounting system 100 facilitates the mounting of a transceiver 120 to an antenna structure 122 in a cellular communication system. To facilitate this, the mounting system 100 includes an antenna mounting bracket 102, a transceiver mounting bracket 104, and guide rails 106. In general, the antenna mounting bracket 102 is configured to attach to the antenna structure 122 while the transceiver mounting bracket 104 is configured to attach to the transceiver 120, and the guide rails 106 are configured to attach to both the antenna mounting bracket 102 and the transceiver mounting bracket 104.

Specifically, the guide rails 106 are configured to attach to the antenna mounting bracket 102 and include channels to receive corresponding hooked structures on the transceiver mounting bracket 104. More specifically, the transceiver mounting bracket 104 includes first and second hooked structures, and guide rails 106 include first and second channels that are considered to receive the hooked structures. Thus, the hooked structures can slide into the first and second channels on a pair of the guide rails 106. It should be noted that FIG. 1 shows two pairs of guide rails 106, with the upper pair of guide rails 106 shown engaged with a transceiver mounting bracket 104 mounted to a transceiver 120 and the lower pair of guide rails 106 empty and ready to receive a second transceiver mounting bracket 104 with a second transceiver 120 if desired.

Figure 2A:
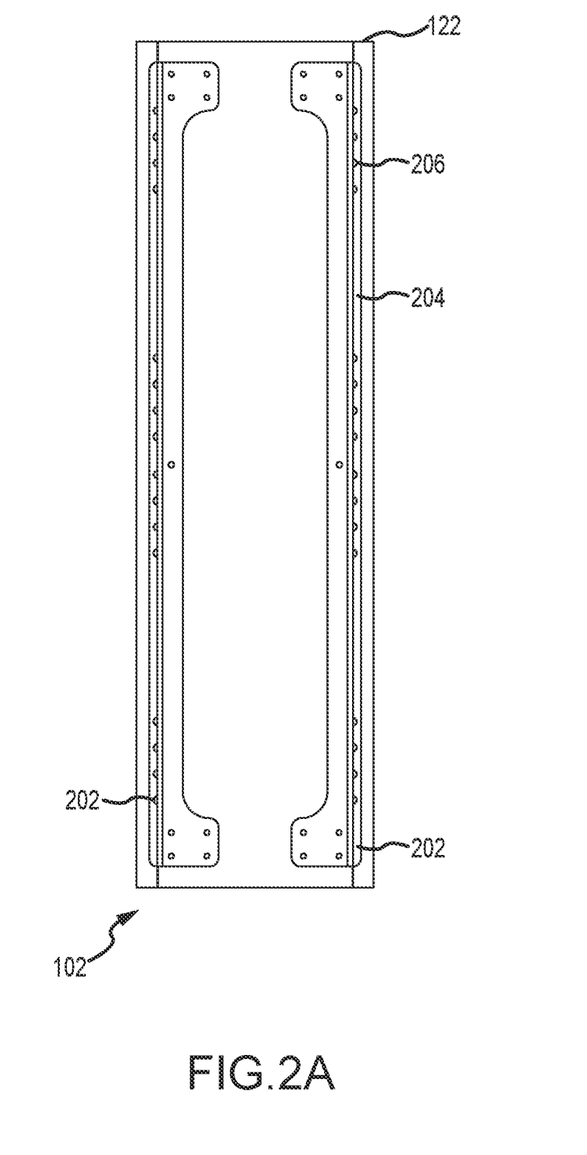
FIGS. 2A and 2B are front and top views of an antenna mounting bracket in accordance with the embodiments described herein.
Figure 2B:
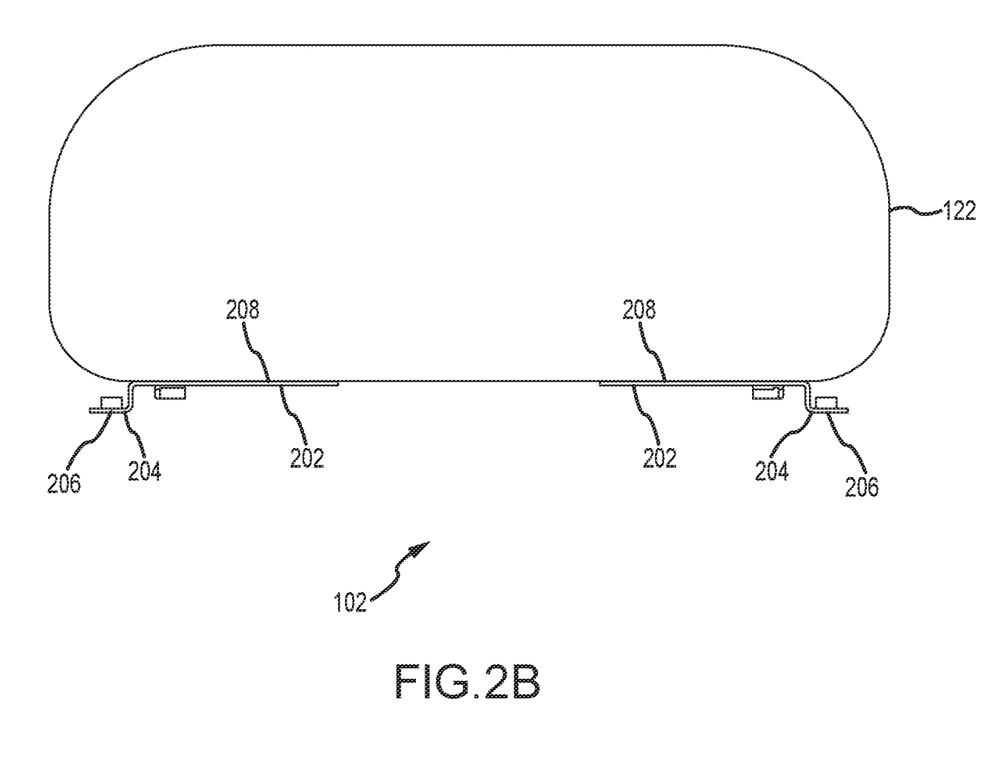

Turning now to FIGS. 2A and 2B, a front view and a top view of an antenna structure 122 and antenna mounting bracket 102 are illustrated. Again, the antenna mounting bracket 102 is configured to attach to the antenna structure 122. In this illustrated embodiment, the antenna mounting bracket 102 comprises a pair of brackets 202 arranged in parallel, with each of the pair of brackets 202 configured to attach to the back surface of the antenna structure 122.

In this illustrated embodiment the pair of brackets 202 each includes a mounting surface 208 for mounting to a back surface of the antenna structure 122 and at least one attachment face 204 offset from the mounting surface 208. In the example of FIGS. 2A and 2B the attachment face 204 is part of a lip that is offset from the mounting surface. Each attachment face 204 includes a plurality of mounting holes 206 facing away from the back surface of the antenna structure 122 and having a predefined spacing. Facing the mounting holes 206 away from the back surface of the antenna structure and the offset configuration of the attachment face 204 allows bolts to be inserted through the mounting holes 206 without contacting the back surface of the antenna structure 122. As will be described in greater detail below, the mounting holes 206 have predefined spacing to facilitate the mounting of a plurality of guide rails (e.g., guide rails 106) to the antenna mounting bracket 102 at multiple different positions along the pair of brackets 202. Thus, these multiple different positions of the mounting holes 206 along the pair of brackets 202 correspond to possible locations for mounting guide rails.

In the embodiment shown in FIG. 2A there are 16 mounting holes in each of the brackets 202 for a total of 32 mounting holes. As will be described in detail down below, each guide rail mounts to the antenna mounting bracket 102 with four bolts—two on each bracket 202. Thus, in this example of FIG. 2A the mounting holes 206 are such that there are 8 different locations where guide rails can be mounted, although only two or four guide rails will typically be mounted at one time. And again, the spacing of the mounting holes 206 is implemented to facilitate the mounting of a plurality of guide rails to the antenna mounting bracket 102 at locations needed to receive the transceiver mounting bracket(s) for multiple types of transceivers.

It should be noted that FIGS. 2A and 2B illustrates only example embodiment of an antenna mounting bracket 102 and the attachment faces 204 that provide an offset from the mounting surface 208, and that other implementations are possible. For example, the antenna mounting bracket 102 could be implemented with I-beam shaped rails. For example, the I-beams shaped rails can be made from extruded aluminum or other suitable material. In that case the I-beams provide the offset attachment face in which mounting holes can be formed (e.g., drilled and tapped, and/or threaded inserts installed). As other examples, the mounting bracket 102 can be implemented with H-beam or channel shaped rails that provide the offset attachment face. As yet other examples, the mounting bracket 102 could be implemented with rectangular or other shaped tubing, and again the tubing can provide the offset attachment face in which mounting holes can be formed.

Figure 3A:
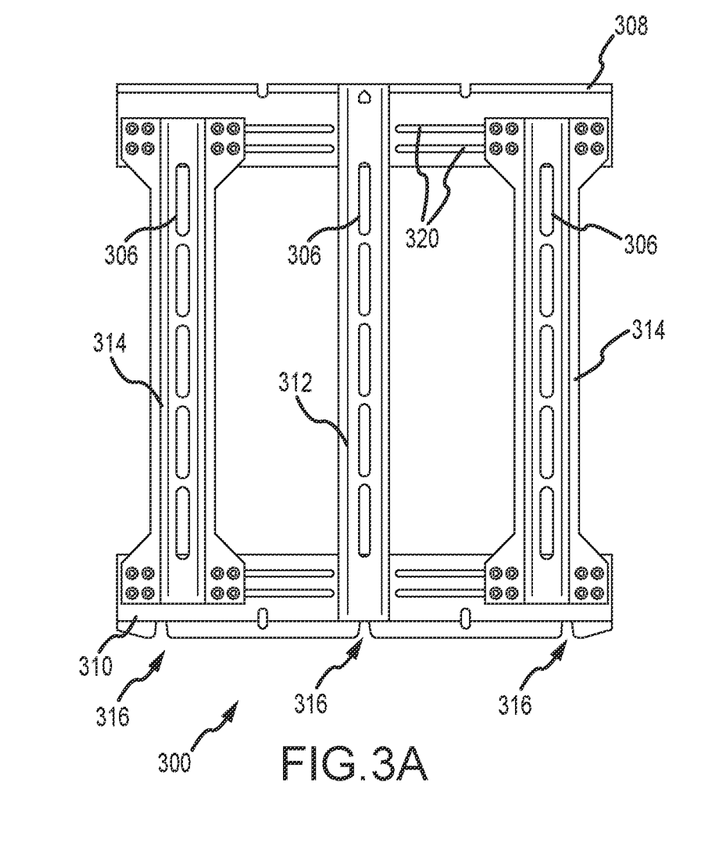
FIGS. 3A and 3B are front and side views of a transceiver mounting bracket in accordance with the embodiments described herein.
Figure 3B:
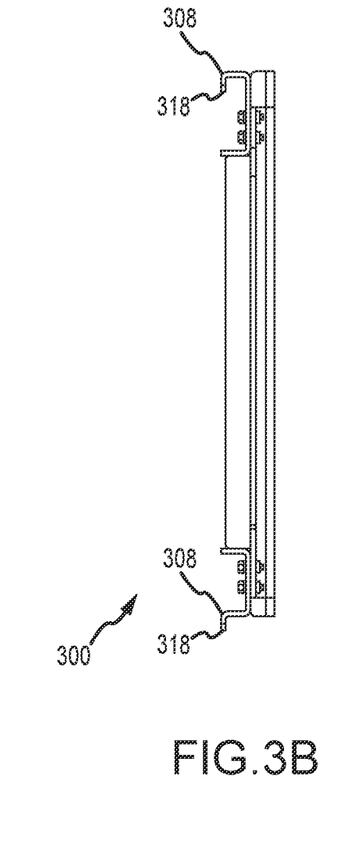

Turning now to FIGS. 3A and 3B, a front view and a side view of a transceiver mounting bracket 300 are illustrated. Again, the transceiver mounting bracket 300 is configured to attach to a transceiver (e.g., transceiver 122 in FIG. 1) and slide into a pair of guide rails (e.g., guide rails 106 in FIG.

1) to facilitate the mounting of the transceiver to an antenna structure (e.g., antenna structure 122 in FIG. 1).

In this illustrated embodiment the transceiver mounting bracket 300 includes two outer legs 314 and a center leg 312. The two outer legs 314 and the center leg 312 each include a plurality of slots 306 that facilitate attachment of a transceiver to the transceiver mounting bracket 304. Specifically, each slot 306 is positioned to allow a bolt to pass through the slot and into the transceiver to facilitate secure attachment of the transceiver to the transceiver mounting bracket 304. And in this illustrated embodiment the two outer legs 314 are slideable such that they can be slid to different horizontal positions using the slots 320. Thus, in this embodiment the legs 310 and 314 and the plurality of slots 306 have a configuration that facilitates the variable spacing of mounting bolts to facilitate the mounting of multiple types of transceivers to the transceiver mounting bracket 300. Thus, the same transceiver mounting bracket 300 can be used to mount multiple different types of transceivers to an antenna (e.g., antenna structure 122 in FIG. 1).

The transceiver mounting bracket 300 also includes a first hooked structure 308 and a second hooked structure 310. The first hooked structure 308 extends along the top of the transceiver mounting bracket 300, while the second hooked structure 310 extends along the bottom. Each hooked structure 308 and 310 provides a hanging edge 318 from which the transceiver mounting bracket 300 hangs when the transceiver mounting bracket 300 is slid into guide rails. Specifically, the first and second hooked structures are configured to slide into corresponding first and second channels on a pair of the guide rails that are mounted to the antenna structure and the hanging edges 318 act as hooks to hang the transceiver mounting bracket 300 from the channels in the guide rails. And as will be described in greater detail below, the guide rails can include clamping surfaces that can be tightened to clamp down on the hooked structures to hold the transceiver mounting bracket 304 into place.

The transceiver mounting bracket 300 also includes a plurality of detent holes 316 spaced across the bottom of the transceiver mounting bracket. The plurality of detent holes 306 are configured to receive a detent pin to secure the transceiver mounting bracket at a plurality of different locations. Specifically, as will be described in greater detail, the lower guide rail can include a detent pin, where the detent pin can slide into and be pulled out of the plurality of detent holes 306. Because there are a plurality of detent holes 306 the detent pin can be used to secure the transceiver mounting bracket in a plurality of different locations relative to the second guide rail. Typically, the center detent hole 306 would be used to temporarily secure the transceiver mounting bracket 300 in its final mounting position, while the outer detent holes 306 can be used to temporarily secure the transceiver mounting bracket 300 in offset positions that may be used during repair or installation. This is especially important in cases where the transceivers are large and bulky and may be partially blocked by structural features when in the center position.

Figure 4A:
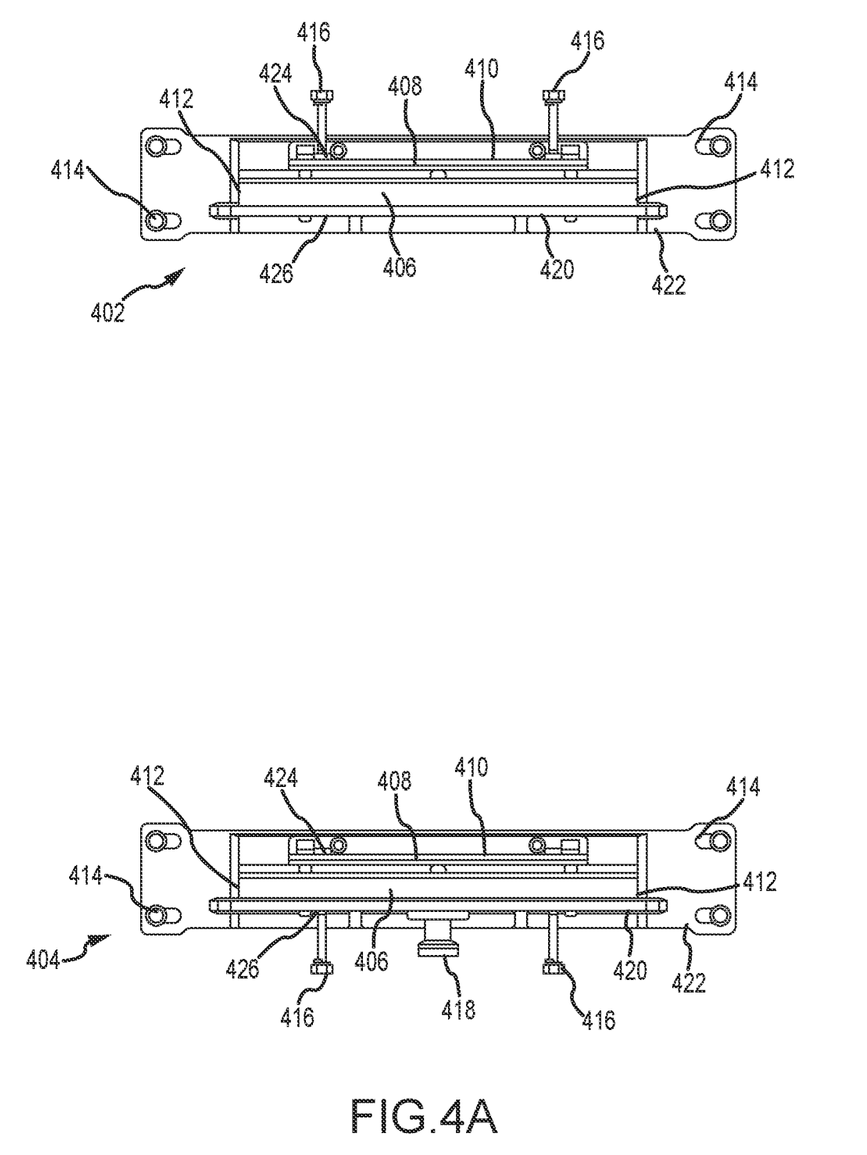
FIGS. 4A, 4B, and 4C are front and perspective views of guide rails in in accordance with the embodiments described herein.
Figure 4B:
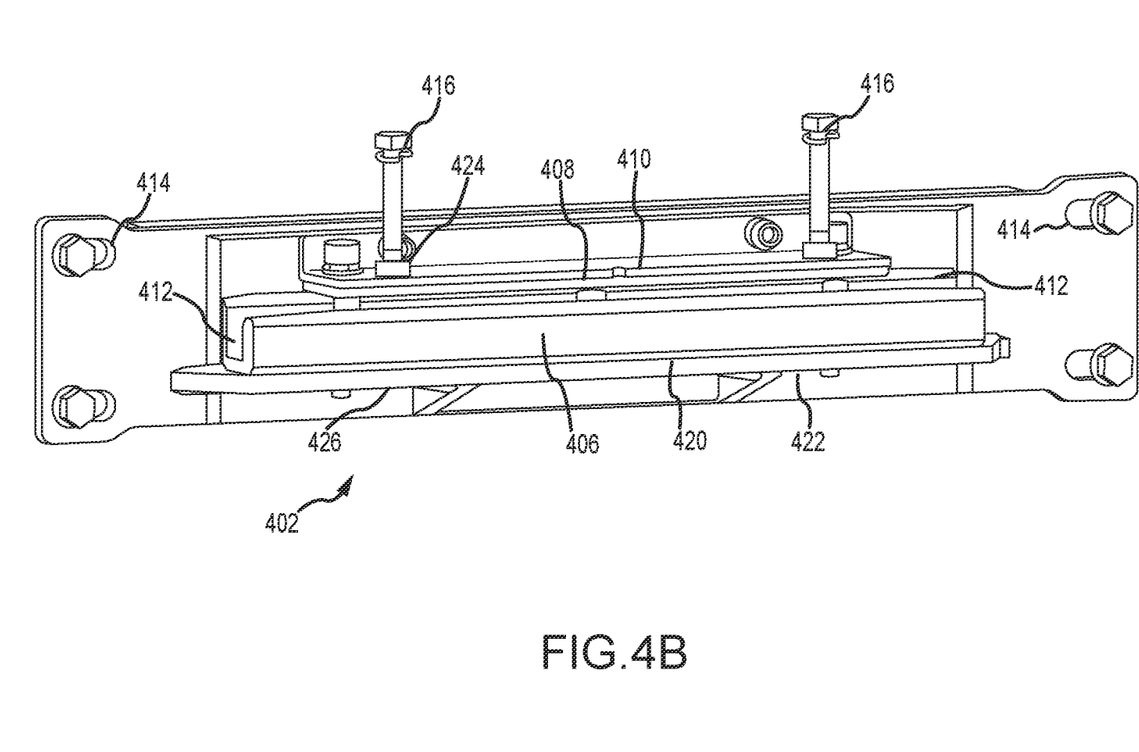
Figure 4C:
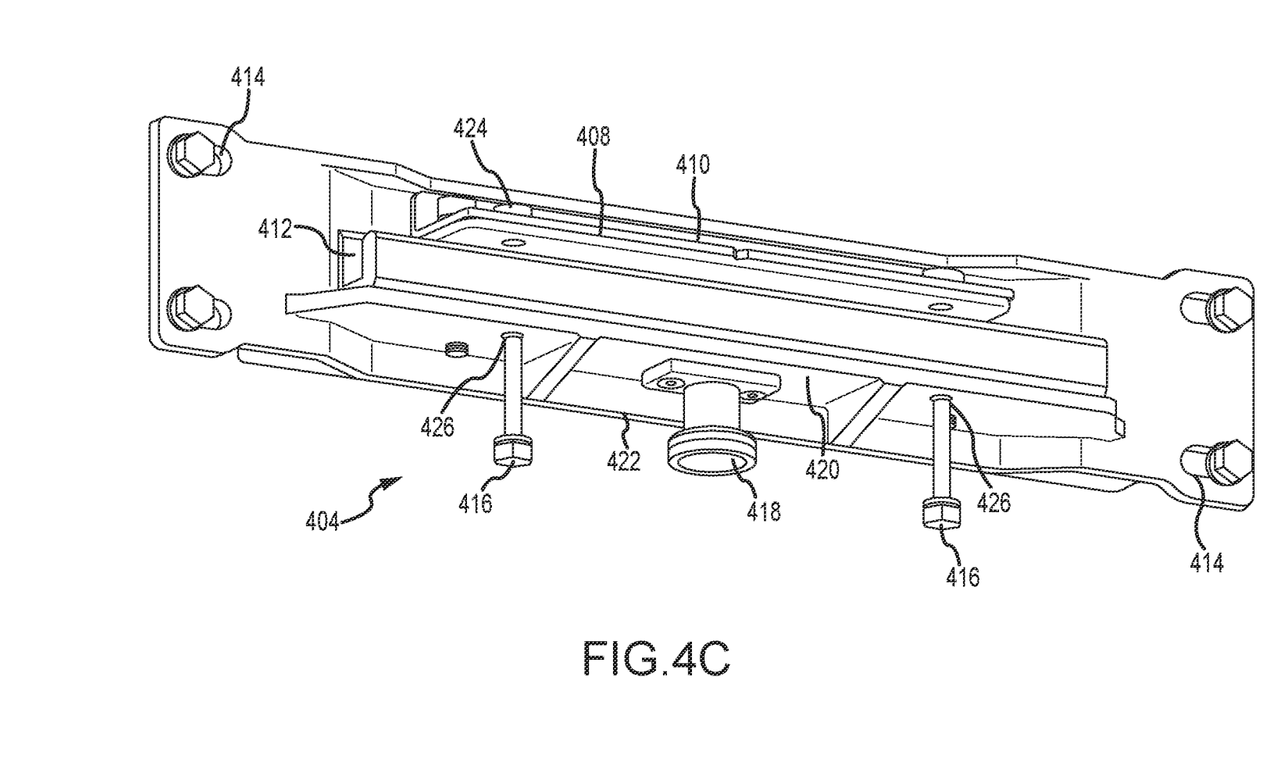

Turning now to FIGS. 4A, 4B and 4C, front and perspective views of an upper guide rail 402 and a lower guide rail 404 are illustrated. As was described above, the guide rails 402, 404 are configured to attach to an antenna mounting bracket (e.g., antenna mounting bracket 102 in FIG. 1 and FIG. 2) and to receive a transceiver mounting bracket (e.g., transceiver mounting bracket 104 in FIG. 1 and transceiver mounting bracket 300 in FIG. 3).

In general, the guide rails 402, 404 include a main body 422 made from a rigid material such as aluminum. The main body 422 includes multiple slots 414 for mounting to the antenna mounting bracket and a shelf 420 upon which the channel 406 is mounted. For example, the shelf 420 can be cast from aluminum as part of the main body 422. The channels 406 are then attached to the shelf 420.

In general, the channels 406 are configured to receive the hooked structures on the transceiver mount bracket (e.g., the hooked structures 308, 310 of FIG. 3) such that the hooked structures hang from the channels 406. In this illustrated embodiment channels 406 each include openings 412 at each end that allow the hooked structures on the transceiver mount bracket to slide in from either side of the guide rails 402, 404, facilitating easier installation of the transceiver mounting bracket onto the guide rails 402, 404.

The guide rails 402, 404 also each include a clamping mechanism to pull the hooked structures down to securely hold the hooked structures in the channels 406. The clamping mechanism includes a clamping surface 408, a plate 410 and fasteners 416. In general, the clamping mechanism provides a clamping force on the top of the hooked structures of the transceiver mount bracket to securely hold it in place. Notably, when the clamping mechanism is not providing the clamping force the hooked structures can freely slide within the channels 406.

The channels 406 and clamping surface 408 are preferably made of a non-conductive material such as polyoxymethylene, commonly sold under the trademark of Delrin®. Of course, other non-conductive materials can be used. The plate 410 adds rigidity to the clamping surface and 408 can be made from aluminum.

The fasteners 416 can be bolts that extend through the clamping surface 408 and screw into the shelf 420. In some embodiments the fasteners 416 comprise bolts that either screw down into the shelf 420 or up into captive nuts 424 on the plate 410. And as will be described in greater detail blow, these fasteners 416 can be implemented with only partially threading and a reduced diameter center section of the body.

Before the installation of a transceiver mounting bracket the fasteners 416 on the upper guide rail 402 can be partially screwed into captive nuts 424 as shown in FIG. 4. Likewise, before the installation of a transceiver mounting bracket the fasteners 416 on the lower guide rail 404 can be partially screwed into threaded holes 426 on the shelf 420 as shown in FIG. 4. In both cases that prevents the fasteners from being lost, while still allowing the transceiver mounting bracket to be slid into and/or out of the channels 406.

Then, with the transceiver mounting bracket slid into place in the channels 406 the fasteners 416 can be fully inserted to engage the corresponding threads on the other side of the clamping mechanism to fully secure the transceiver.

Specifically, fasteners 416 on the upper guide rail are fully inserted down past the channel 406 to screw into holes 426 on the shelf 420. Screwing the fasteners 416 of the upper guide rail 402 into the holes 426 provides a clamping force on the clamping surface 408 to secure the transceiver mounting bracket in the channel 406.

Likewise, the fasteners 416 on the lower guide rail 404 are fully inserted up past the channel 406 to screw into the captive nuts 424 on the plate 410. Screwing the fasteners 416 of the lower guide rail 404 into the captive nuts 424 again provides a clamping force on the clamping surface 408 to secure the transceiver mounting bracket in the channel 406.

Figure 5:
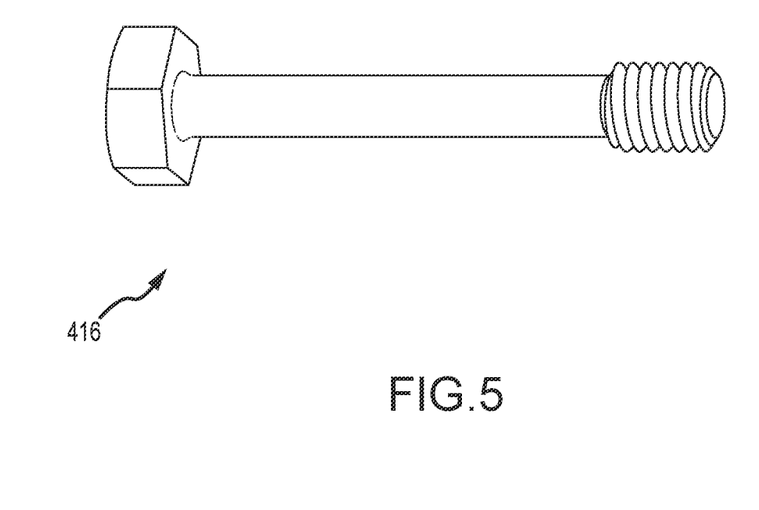
FIG. 5 is a side view of a fastener in accordance with the embodiments described herein.

Turning briefly to FIG. 5, one example of fastener 416 is illustrated. In this example, the fastener 416 is only partially threaded and has a reduced diameter body. This allows the fastener 416 to pass through without engaging one set of threads (on either the captive nuts 424 or the threaded holes 426) while engaging with the other set of threads (again on the threaded holes 426 or the captive nuts 424), and thus allows the fasteners to apply a clamping force between the clamping surface 408 and the channel 406.

Returning to FIG. 4, the lower guide rail 404 includes a detent pin 418. The detent pin 418 allows the position of the transceiver mounting bracket to be secured prior to the clamping surface 408 being engaged. Specifically, as was described above the transceiver mounting bracket can include multiple detent holes, with each detent holes configured to secure the transceiver mounting bracket at a different location relative to the guide rails when engaged with the detent pin 418. To facilitate use the detent pin 418 it can include a pull handle to release the detent pin 418 and a spring to cause engagement of the detent pin 418.

Figure 6:
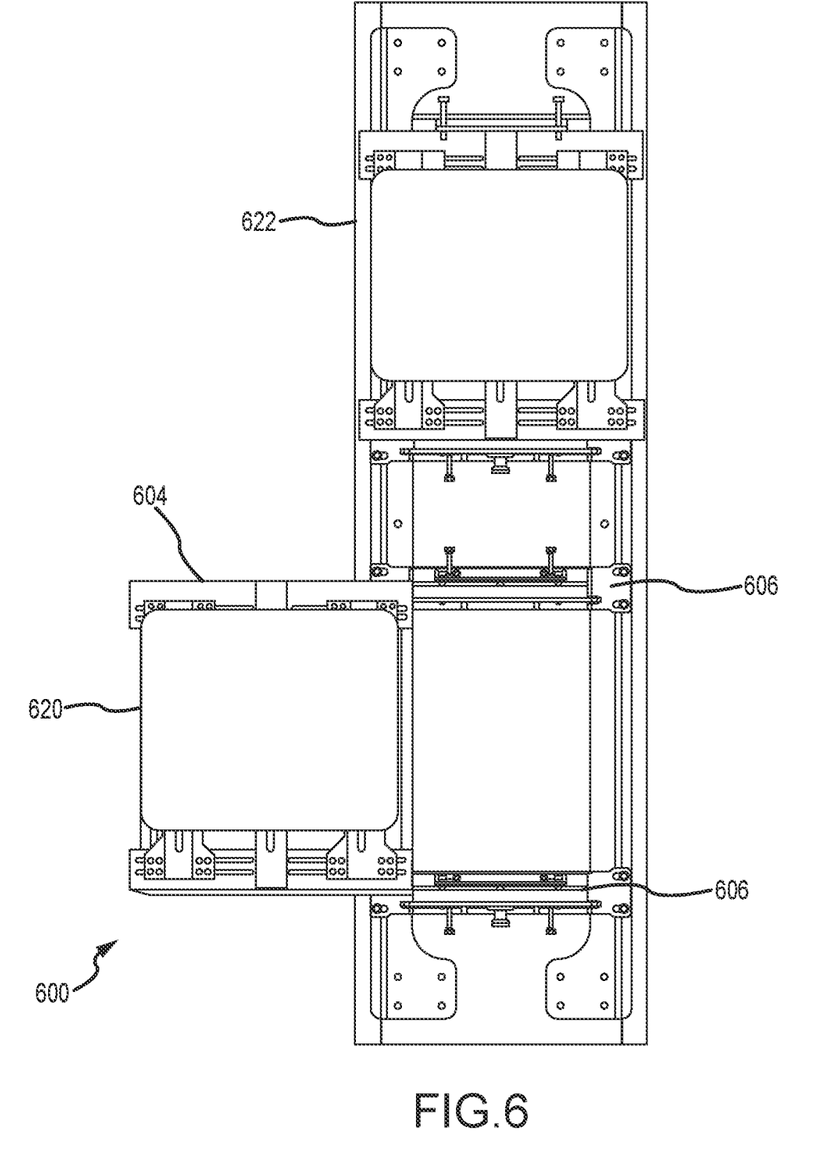
FIG. 6 is a front view of a transceiver mounting system in accordance with the embodiments described herein.

Turning now FIG. 6, a front view of a mounting system 600 is illustrated. Again, the mounting system 600 facilitates the mounting of a transceiver 620 to an antenna structure 622 in a cellular communication system. In this illustration a second transceiver 620 is being mounted by sliding the second transceiver mounting bracket 604 into a lower pair of guide rails 606. Again, such a mounting can be performed from either side of the mounting system 600, and thus can facilitate relatively easy mounting of the transceiver on the antenna even when another transceiver has been previously mounted to the antenna structure 622.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A mounting system to mount a transceiver to an antenna structure, the mounting system comprising:
   at least one antenna mounting bracket to attach to the antenna structure, the at least one antenna mounting bracket including at least one attachment face, the at least one attachment face configured to be offset from a back surface of the antenna structure, the at least one attachment face including a plurality of mounting holes having a predefined spacing;
   a transceiver mounting bracket to attach to the transceiver, the transceiver mounting bracket including a first hooked structure and a second hooked structure;
   a first guide rail to attach to the at least one antenna mounting bracket, the first guide rail including a first channel to receive the first hooked structure; and
   a second guide rail to attach to the at least one antenna mounting bracket, the second guide rail including a second channel to receive the second hooked structure.

2. The mounting system of claim 1 wherein the at least one mounting bracket comprises a pair of mounting brackets arranged in parallel on the back surface of the antenna structure.

3. The mounting system of claim 1 wherein the plurality of mounting holes are perpendicular to the back surface of the antenna structure.

4. The mounting system of claim 1 wherein the first hooked structure extends along a top edge of the transceiver mounting bracket and the second hooked structure extends along a bottom edge of the transceiver mounting bracket.

5. The mounting system of claim 1 wherein the transceiver mounting bracket includes a plurality of mounting holes to facilitate mounting to the transceiver.

6. The mounting system of claim 1 wherein the first channel includes two ends, and wherein the first channel includes openings at each of the two ends to facilitate entry of the first hooked structure from either of the two ends, and wherein the second channel includes two ends, and wherein the second channel includes openings at each of the two ends to facilitate entry of the first hooked structure from either of the two ends.

7. The mounting system of claim 1 wherein the first guide rail includes a first clamping surface and a first fastener, wherein the first fastener is configured to pull the first clamping surface towards the first hooked structure to secure the first hooked structure in the first channel, and wherein the second guide rail includes a second clamping surface and a second fastener, wherein the second fastener is configured to pull the second clamping surface towards the second hooked structure to secure the second hooked structure in the second channel.

8. The mounting system of claim 7 wherein the first channel, the second channel, the first clamping surface, and the second clamping surface are formed from electrically isolating material.

9. The mounting system of claim 1 wherein the second guide rail includes a detent pin.

10. The mounting system of claim 9 wherein the transceiver mounting bracket includes a plurality of detent holes spaced across the transceiver mounting bracket, the plurality of detent holes configured to selectively receive the detent pin and secure the transceiver mounting bracket at a plurality of different locations relative to the second guide rail.

11. A mounting system to mount a transceiver to an antenna structure, the mounting system comprising:
   an antenna mounting bracket to attach to the antenna structure;
   a transceiver mounting bracket to attach to the transceiver, the transceiver mounting bracket including a first hooked structure and a second hooked structure;
   a first guide rail to attach to the antenna mounting bracket, the first guide rail including a first channel, a first clamping surface, and a first pair of fasteners, the first channel including open ends to slide the first hooked structure into the first channel from either side of the first channel, and wherein the first pair of fasteners is configured to pull the first clamping surface towards the first hooked structure to secure the first hooked structure in the first channel; and
   a second guide rail to attach to the antenna mounting bracket, the second guide rail including a second channel, a second clamping surface, and a second pair of fasteners, the second channel including open ends to slide the second hooked structure into the second channel from either side of the second channel, and wherein the second pair of fasteners is configured to pull the second clamping surface towards the second hooked structure to secure the second hooked structure in the second channel.

12. The mounting system of claim 11 wherein the antenna mounting bracket comprises a pair of mounting brackets arranged in parallel on a back surface of the antenna structure.

13. The mounting system of claim 11 wherein the antenna mounting bracket includes a plurality of mounting holes that face away from a back surface of the antenna structure.

14. The mounting system of claim 11 wherein the first hooked structure extends along a top edge of the transceiver mounting bracket and the second hooked structure extends along a bottom edge of the transceiver mounting bracket.

15. The mounting system of claim 11 wherein the transceiver mounting bracket includes a plurality of mounting holes to facilitate mounting to the transceiver.

16. The mounting system of claim 11 wherein the transceiver mounting bracket includes a slideable legs that each include a plurality of mounting holes to facilitate mounting to the transceiver.

17. The mounting system of claim 11 wherein the first channel, the second channel, the first clamping surface, and the second clamping surface are formed from electrically isolating material.

18. The mounting system of claim 11 wherein the second guide rail includes a detent pin.

19. The mounting system of claim 18 wherein the transceiver mounting bracket includes a plurality of detent holes spaced across the transceiver mounting bracket, the plurality of detent holes configured to selectively receive the detent pin and secure transceiver mounting bracket at a plurality of different locations relative to the second guide rail.

20. A mounting system to mount a transceiver to an antenna structure, the mounting system comprising:
a pair of antenna mounting brackets to attach to the antenna structure, the pair of antenna mounting brackets each including an attachment face, each attachment face configured to be offset from a back surface of the antenna structure, each face including a plurality of mounting holes facing away from the back surface of the antenna structure and having a predefined spacing;
a transceiver mounting bracket to attach to the transceiver, the transceiver mounting bracket including a first hooked structure extending along a top edge of the transceiver mounting bracket, the transceiver mounting bracket including a second hooked structure extending along a bottom edge of the transceiver mounting bracket;
a first guide rail to attach to the antenna mounting bracket, the first guide rail including a first channel, a first clamping surface, and a first pair of fasteners, the first channel including open ends to slide the first hooked structure into the first channel from either side of the first channel, and wherein the first pair of fasteners is configured to pull the first clamping surface towards the first hooked structure to secure the first hooked structure in the first channel;
a second guide rail to attach to the antenna mounting bracket, the second guide rail including a second channel, a second clamping surface, and a second pair of fasteners, the second channel including open ends to slide the second hooked structure into the second channel from either side of the second channel, and wherein the second pair of fasteners is configured to pull the second clamping surface towards the second hooked structure to secure the second hooked structure in the second channel; and
wherein the second guide rail includes a detent pin and wherein the transceiver mounting bracket includes a plurality of detent holes spaced across the transceiver mounting bracket, the plurality of detent holes configured to selectively receive the detent pin and secure transceiver mounting bracket at a plurality of different locations relative to the second guide rail.

\* \* \* \* \*